H. J. HERBERT & D. WARD.
SPRING WHEEL.
APPLICATION FILED APR. 17, 1909.
935,982.
Patented Oct. 5, 1909.
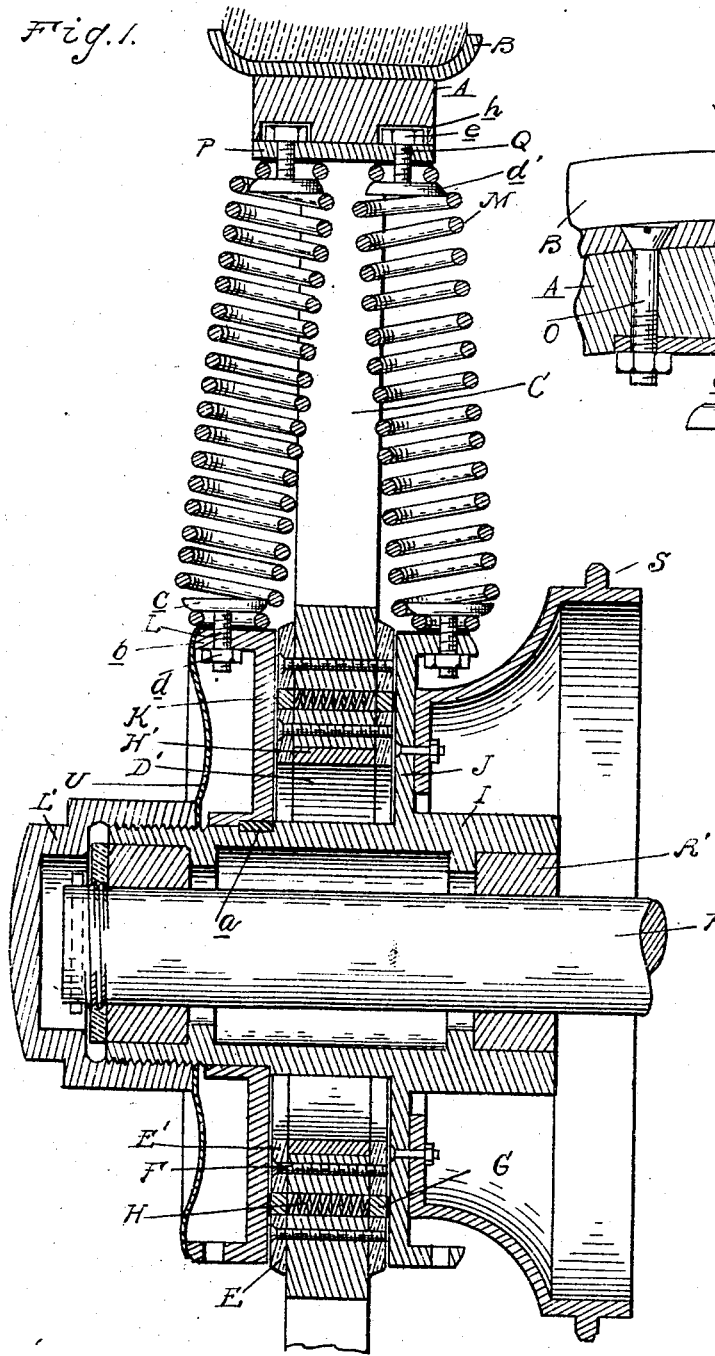
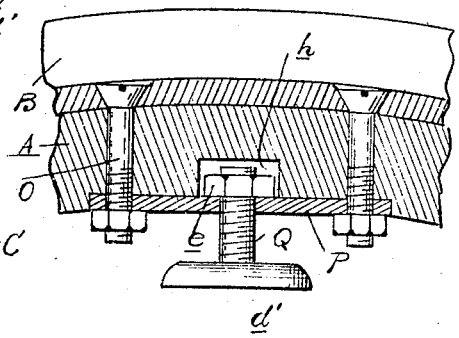
Witnesses
Inventors
Henry J. Herbert
Dell Ward
By Whittemore Hulbert & Whittemore
attys.

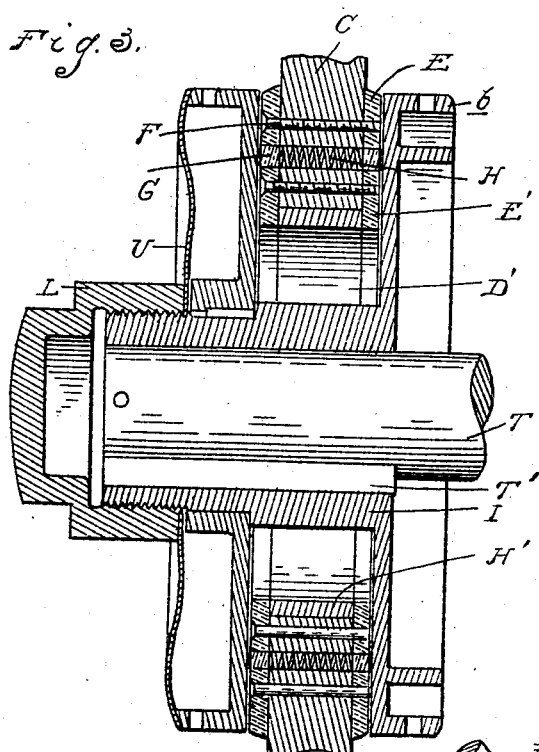
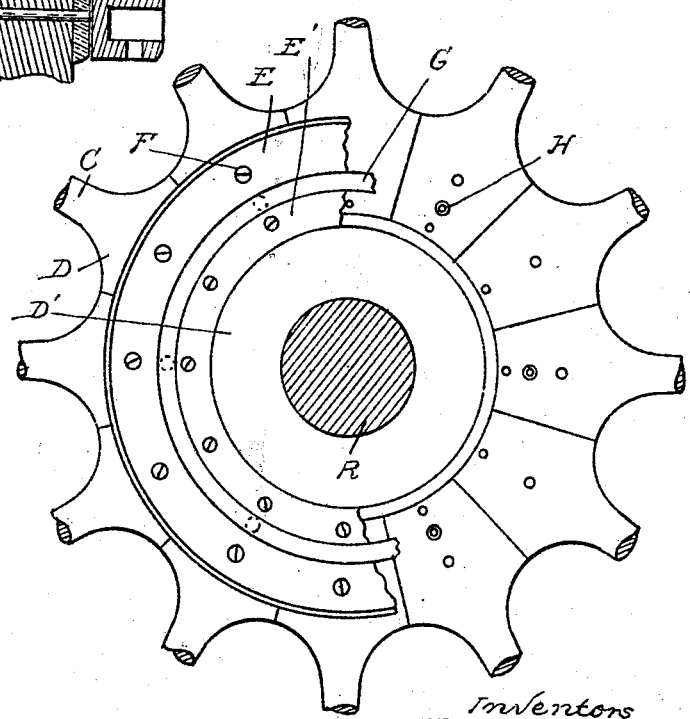

UNITED STATES PATENT OFFICE.

HENRY J. HERBERT AND DELL WARD, OF DETROIT, MICHIGAN, ASSIGNORS TO JOHN KELSEY, TRUSTEE, OF DETROIT, MICHIGAN.

SPRING-WHEEL.

935,982.

Specification of Letters Patent.

Patented Oct. 5, 1909.

Application filed April 17, 1909. Serial No. 490,568.

*To all whom it may concern:*

Be it known that we, HENRY J. HERBERT and DELL WARD, citizens of the United States of America, residing at Detroit, in the county of Wayne and State of Michigan, have invented certain new and useful Improvements in Spring-Wheels, of which the following is a specification, reference being had therein to the accompanying drawings.

This invention relates to new and useful improvements in wheels, and consists in the construction of a wheel which is suspended by radial springs extending between the felly of the wheel and the axle hub, the hub of the wheel being guided between flanges or guide plates on said axle hub.

The invention further consists in the construction, arrangement and combination of the parts, whereby the device is rendered practical, economical and efficient in use; all as more fully hereinafter described and particularly pointed out in the claims.

In the drawings: Figure 1 is a vertical central section through a wheel of our improved construction, the springs at one side of the center only being shown, and the wheel illustrated being a drive wheel, such for instance, as used in automobile construction, in which a chain drive is applied direct to the wheel; Fig. 2 is a longitudinal section through a portion of the felly; Fig. 3 is a section similar to Fig. 1, some of the parts being omitted, showing the invention applied to a construction in which the axle is driven; and Fig. 4 is an elevation of the wheel hub with some of the parts broken away to illustrate the construction of the remaining parts.

A represents the felly, B the rim thereon, in which ordinarily a solid tire (not shown) is intended to be inserted. Secured to the felly, and extending inward, are the wooden spokes C, which are enlarged at their inner ends as shown in Fig. 4 and form a wheel hub D, having an enlarged opening D' within. In order to strengthen this hub and also to face it on the sides to provide against wear, we secure to the sides of this wheel hub two facing rings E and E', slightly separated, and we have shown these as secured in position by means of screws F. Between these two rings on opposite sides, we preferably insert the packing rings G, and hold them slightly out beyond the faces of the rings E E' by means of springs H secured in apertures through the wheel hub, the opposite ends abutting against the inner faces of the packing rings G. These packing rings may be of metal, fiber, or other suitable material. The inner face of the wheel hub we preferably line with the hub band H' secured in position by being arranged within the inner rings E.

The axle hub consists of the sleeve I, upon which is secured a circular flange J, preferably integral therewith. K is a similar circular flange, likewise secured to the sleeve I, but detachable. We have shown it in this instance as secured by means of the key $a$, and also by means of the cap L'. These two flanges J and K are separated a distance substantially equal to the width of the wheel hub, and the wheel hub fits between these flanges, as clearly shown in Fig. 1, the diameter of the opening D' being considerably greater than the diameter of the sleeve I, so as to leave room for the play of the wheel in relation to the axle hub. A tight joint may be maintained between the wheel hub and the flanges J and K, by means of the packing rings G. At the periphery of the flanges J, K, are provided the lugs or flanges $b$, suitably apertured and adapted to receive the bolts L. These bolts L are provided with enlarged heads $c$ and within the flange a suitable nut $d$ enables the operator to secure the bolt in position.

M are open coil springs, preferably having tapering ends. A bolt L is engaged within one end of a spring, the head fitting within the smaller coils, as clearly shown in Fig. 1. At their opposite ends the springs are secured to the felly. As in use these springs sometimes break, it is desirable to so attach the springs that they may be attached and detached without dismantling the wheel, and this we are enabled to do by the construction described.

O are screws, the heads of which fit in countersunk apertures in the rim B, and the lower ends project through the felly within, as clearly shown in Fig. 2. These screws secure in position a plate P, having on each side an aperture in which engages the stem of a bolt or screw Q. This bolt has an enlarged rounded head $d'$ fitting in the outer contracted portion of one of the coil springs, and a nut $e$ in a recess $h$ in the inner face of the felly secures the bolt to the plate.

With this construction it will be observed that the springs are arranged in pairs opposite each other on opposite sides of the felly and extending radially from the felly to the flanges J, K, of the axle hub; and that any spring or pair of springs can be detached and replaced with a new spring or springs without dismantling the wheel.

We have shown an axle R and rollers R' of an ordinary roller bearing, but as this part of the construction is no part of our invention, we do not deem it necessary to further describe the same, as any kind of bearing may be used as desired.

The wheel may be used as a drive wheel, as for instance, as frequently employed for automobiles, by driving the axle hub, either, for instance, by securing to one of the flanges, as J, a sprocket wheel S with which the drive chain may engage, or, where the axle is driven as shown in Fig. 3, by keying the driven axle T to the sleeve I as by the key T'. In both these cases, however, the driving effect is transmitted to the wheel from the axle hub through the springs.

We may, for the purpose of excluding the dust and dirt, and also to improve the appearance of the wheel, place a sheet metal ring U on the outer flange, holding the same in position by means of the cap L'.

We believe it is desirable to arrange the spiral springs M radially, and we also prefer to arrange them in pairs upon opposite sides of the wheel, as shown in Fig. 1, as we find this gives a better and more balanced wheel, and the wheel is more easily guided with less friction between the hub flanges.

It will be seen that we have arranged the spiral springs so that they stand in the spaces between the spokes. This enables us to make the wheel more compact and symmetrical, and prevents any crossing of the springs, as would be necessary with a tangential arrangement either of the springs or of the spokes, and hence prevents the wear and noise which would result if the springs were thus crossed.

In building the wheel it is desirable, if not necessary, to prevent any rattling of the parts, and therefore to prevent rattling of the parts we so arrange the springs in relation to the holding bolts at opposite ends that the heads of the bolts will clamp the first coil of the spring tightly against the hub or the rim.

The springs when put in should be open, that is, the coils separated, and this opening between all the coils should exceed the possible vertical vibration of the wheel in relation to the axle or hub.

The open springs must be put in so that they are normally all under tension, but this tension of such an extent that before the wheel reaches the maximum of its movement in relation to the hub, the spring or springs in that part of the wheel which most nearly approaches the hub will be under compression, before the limit of movement is reached. This prevents any undue tension on the springs and greatly lessens the breakage.

By making a rigid—as distinguished from a pivotal—connection at the ends of the springs, the amount of movement under torque is reduced, and chances of vibration and rattling and noise reduced.

What we claim as our invention is:

1. In a spring wheel, the combination with a wheel and a hub with a limited, guided, sliding movement between the two, of radial, open, spiral springs resiliently suspending the wheel in relation to the hub, such springs being normally under tension of such an extent that before reaching the extreme of movement of the wheel toward the hub, they will be in compression.

2. In a spring wheel, the combination of a hub, separated guide flanges thereon, a wheel having a hub with an enlarged opening between such flanges, and radial, open, spiral springs between the felly of the wheel and the hub flanges, such springs being normally under tension of such an extent that before reaching the extreme of movement of the wheel toward the hub they will be in compression.

3. In a spring wheel, the combination of an axle hub, a wheel having an enlarged hub embracing the axle hub with a play between, guides for guiding the wheel in relation to the hub, open, spiral springs, resiliently suspending the wheel in relation to the hub, and rigid connections between the ends of the springs and the wheel and hub respectively, such springs being normally under tension to such an extent that before reaching the extreme of movement of the wheel toward the hub they will be in compression.

4. In a spring wheel, the combination of an axle hub, separated guide flanges thereon, the wheel having a hub with an enlarged opening embracing the axle-hub and slidingly engaging between the axle-hub flanges, and open spiral springs rigidly connected at their outer ends to the felly of the wheel and at their inner ends to the hub flanges, such springs being normally under tension to such an extent that before reaching the extreme movement of the wheel toward the hub they will be in compression.

In testimony whereof we affix our signatures in the presence of two witnesses.

HENRY J. HERBERT.
DELL WARD.

Witnesses:
JOHN J. GOFITT, Jr.,
ADELAIDE T. ADAMS.